United States Patent [19]

Piotrowski et al.

[11] Patent Number: 4,945,076

[45] Date of Patent: Jul. 31, 1990

[54] POLYMERIZATION CATALYST SYSTEM

[75] Inventors: Andrzej M. Piotrowski, Peekskill; Elliot I. Band, North Tarrytown, both of N.Y.

[73] Assignee: Akzo America Inc., New York, N.Y.

[21] Appl. No.: 386,938

[22] Filed: Jul. 28, 1989

[51] Int. Cl.$^5$ ................................................ C08F 4/64
[52] U.S. Cl. ..................................... 502/117; 502/125
[58] Field of Search ................................. 502/117, 125

[56] References Cited

U.S. PATENT DOCUMENTS

| | | | |
|---|---|---|---|
| 3,740,384 | 6/1973 | Ballard et al. | 502/156 X |
| 4,404,344 | 9/1983 | Sinn et al. | 502/117 X |
| 4,542,199 | 9/1985 | Kaminsky et al. | 502/117 X |
| 4,752,597 | 6/1988 | Turner | 502/117 X |

*Primary Examiner*—Patrick P. Garvin
*Attorney, Agent, or Firm*—Richard P. Fennelly; Louis A. Morris

[57] ABSTRACT

The activity of olefin polymerization catalysts comprising a Group IVB transition metal compound and an aluminoxane can be improved by the addition of a hydroxysiloxane compound.

14 Claims, No Drawings

POLYMERIZATION CATALYST SYSTEM

BACKGROUND OF THE INVENTION

1. Field of the Invention

The present invention relates to the polymerization of olefins using a catalyst system comprising a compound of a Group IVB metal and an aluminoxane.

2. Description of the Prior Art

Various prior art references exist which describe olefin polymerization catalysts comprising a compound of a transition metal belonging to Group IVB of the Periodic Table and an aluminoxane. Included are U.S. Pat. Nos. 4,404,344, 4,542,199, 4,544,762, 4,665,208 and 4,752,597. Also included is PCT Publication No. WO 88/03932. It would be of commercial interest to achieve an increase in the activity of such catalysts.

U.S. Pat. No. 3,740,384 mentions use of 1,1,3,3-tetraphenylsiloxane-1,3-diol to improve the olefin polymerization activity of an organometallic zirconium complex. The catalyst described in this patent is devoid of an aluminoxane component.

SUMMARY OF THE INVENTION

The present invention relates to an improved (more active) catalyst of the aforementioned type which also contains a hydroxysiloxane compound to achieve such activity increase.

DETAILED DESCRIPTION OF THE INVENTION

The catalyst component of the present invention comprises, as one essential component, a transition metal compound of a Group IVB metal, such as titanium, zirconium, and hafnium. Zirconium is an especially preferred metal. These compounds can have a ligand which is a group having a conjugated bi-electron such as cycloalkadienyl. The other ligands can be cycloalkadienyl aryl, alkyl, aralkyl, halogen or hydrogen. These compounds can also have a ligand which is a multidentate compound having at least two groups connected through a lower alkylene group or a substituted silicon atom. These two groups can be the indenyl group, a substituted indenyl group and the partial hydride thereof. The concentration of the metal atoms in the reaction system can range from about $10^{-7}$ to about $10^{-3}$ moles/L. A representative transition metal compound is bis(cyclopentadienyl)dichlorozirconium.

The second essential component of the catalyst is an aluminoxane which is formed by reaction of water with a trialkylaluminum, such as trimethylaluminum. The oligomeric linear and/or cyclic alkyl aluminoxanes known in the art are intended to be included. Generally speaking, this component can be present at from about 0.01 to about 5 moles/L in the reaction system.

Both of the foregoing components are generally known to persons of ordinary skill in the pertinent art and it is intended that the instant disclosure in regard to them is to encompass such generally known components and their equivalents.

In order to achieve the increased activity contemplated by the present invention, the novel catalyst system of this invention also contains an effective amount of a hydroxysiloxane component. This component is of the general formulae

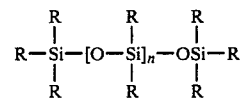

where at least one R is OH and the others are independently selected from —OH, alkyl, and aryl and where n can preferably range from 0 to about 10. It is generally present at from about 1% to about 10% of the weight of the aluminoxane. Representative compounds of this type include such siloxane diols as 1,3-dihydroxytetramethylsiloxane, 1,3-dihydroxy-1,3-dimethyl-1,3-diphenyldisiloxane, and 1,3-dihydroxy-1,3-tetraphenyldisiloxane.

The hydroxysiloxane additive can be advantageously incorporated into the catalyst system by first being admixed with the aluminoxane. This can be done as shown in Example 1 by mixing the aluminoxane and hydroxysiloxane compound in a suitable organic solvent.

The catalyst system described before is useful in the polymerization of olefins such as ethylene and ethylene-alpha-olefin copolymers. Such polymerizations may be performed in either the gas or liquid phase (e.g., in a solvent, such as toluene, or in a diluent, such as heptane). The polymerization can be conducted at conventional temperatures (e.g., 0° to 120° C.) and pressures (e.g., ambient to 50 kg/cm$^2$) using conventional procedures as to molecular weight regulation and the like.

The Examples which follow illustrate certain embodiments of the invention.

EXAMPLE 1

Methylaluminoxane, MAO, (330 mg) prepared from trimethylaluminum (TMAL) and hydrated magnesium sulfate was dissolved in several milliliters of toluene and was treated with 9 mg of 1,3 dihydroxytetramethyldisiloxane (DHMS) to form a slightly gelatinous mixture. The modified aluminoxane mixture was injected into a 250 ml toluene charge in a pressure bottle followed by $1.5 \times 10^{-8}$ mole bis(cyclopentadienyl)dichloro zirconium (Cp$_2$ZrCl$_2$). Ethylene was polymerized for nine minutes at 85.5° C.. The yield of polyethylene was 8.7 grams corresponding to an activity of $14 \times 10^6$ gmPE·gmZr$^{-1}$·hr$^{-1}$·atm.$^{-1}$.

COMPARATIVE EXAMPLE 2

Example 1 was repeated except that the siloxane treatment was omitted and the polymerization lasted fifteen minutes The polyethylene product (7.3 grams) was collected, corresponding to an activity of only $6.9 \times 10^6$ gmPE·gmZr$^{-1}$·hr$^{-1}$·atm.$^{-1}$.

EXAMPLE 3

Example 1 was repeated using 340 mg MAO prepared from hydrated magnesium chloride treated with 8.4 mg DHMS, $2.4 \times 10^{-8}$ moles of Cp$_2$ZrCl$_2$, and with a polymerization time of eight minutes. The polymer yield was 9.9 grams giving an activity of $10 \times 10^6$ gmPE·gmZr$^{-1}$·hr$^{-1}$·atm$^{-1}$.

COMPARATIVE EXAMPLE 4

Example 3 was repeated omitting the siloxane treatment, using $1.9 \times 10^{-8}$ moles of Cp$_2$ZrCl$_2$ and polymerizing for fifteen minutes. The polymer yield was 7.6 grams giving an activity of $5.4 \times 10^6$ gmPE·gmZr$^{-1}$·hr$^{-1}$·atm$^{-1}$.

EXAMPLE 5

MAO (330 mg) prepared from hydrated magnesium chloride was dissolved in several milliliters of toluene and was treated with 11 mg of 1,3- dihydroxy-1,3-dimethyl-1,3-diphenyldisiloxane (DHDMDPDS) to form a clear nonviscous solution. This solution was injected into a 250 ml toluene charge in a pressure bottle followed by $1.35 \times 10^{-8}$ mole of bis(cyclopentadienyl)-dichloro zirconium Ethylene was polymerized for six minutes. The yield of polyethylene was 9.55 grams which corresponds to an activity of $24 \times 10^6$ gmPE·gmZr$^{-1}$·hr$^{-1}$·atm$^{-1}$.

EXAMPLE 6

Example 5 was repeated using 22 mg of 1,3-dihydroxy-1,3-tetraphenyldisiloxane in place of DHDMDPDS. The amount of Cp$_2$ZrCl$_2$ catalyst charge was $1.38 \times 18^{-8}$ moles and the polymerization time was nine minutes. The polymer yield was 9.2 grams corresponding to an activity of $17 \times 10^6$ gmPE·gmZr$^{-1}$·hr$^{-1}$·atm$^{-1}$.

COMPARATIVE EXAMPLE 7

Example 5 was repeated omitting the siloxane treatment, using $1.26 \times 10^{-8}$ moles of Cp$_2$ZrCl$_2$ and polymerizing for fifteen minutes. The polymer yield was 5.93 grams corresponding to an activity of only $6.4 \times 10^6$ gmPE·gmZr$^{-1}$·hr$^{-1}$·atm$^{-1}$.

EXAMPLE 8

DHDMDPDS (12 mg) was added to 3.4 grams of a toluene solution of MAO containing 4.51% Al. Then 0.0049 gram of a toluene solution containing $1.8 \times 10^{-3}$ mole Cp$_2$ZrCl$_2$ was added to the MAO solution. The mixed solution was injected into a pressure bottle containing 250 ml heptane at 82° C. The vessel was maintained at 88° C. for twenty minutes at 47 psig ethylene. After three minutes ethylene uptake became noticeable. Polyethylene (5.7 grams) was collected corresponding to an activity of $3.2 \times 10^5$ gmPE/gmZr$^{-1}$·hr$^{-1}$·atm$^{-1}$. The polymer had an MFI (melt flow index) of 3.3 grams/ten minutes.

COMPARATIVE EXAMPLE 9

By syringe, 0.004 gram of a toluene solution containing $1.8 \times 10^{-7}$ mole Cp$_2$ZrCl$_2$ was added to 3.4 grams of a toluene solution of MAO containing 4.51% Al. The mixed solution was injected into a pressure bottle containing 250 ml heptane at 80° C. The vessel was maintained at 88° C. for twenty minutes at 46 psig ethylene. There was no ethylene uptake for the first six minutes after which the polymerization began. Polyethylene (3.6 grams) was collected corresponding to an activity of $2.1 \times 10^5$ gmPE/gmZr$^{-1}$·hr$^{-1}$·atm$^{-1}$. The polymer had an MFI of 3.4 grams/ten minutes.

COMPARATIVE EXAMPLE 10

By syringe, 0.0062 mg of a toluene solution containing $1.6 \times 10^{-8}$ moles of Cp$_2$ZrCl$_2$ was added to 3.4 grams of a toluene solution of MAO containing 4.51% Al and 0.0881 gram of polydimethylsiloxane silanol terminated, approximately equal to 1700 molecular weight, containing 2.5% OH. The mixed solution was injected into a pressure bottle containing 250 ml of toluene and was pressurized to 45 psig with ethylene at 85° C. No polymerization occurred.

The foregoing Examples have been presented for illustrative reasons and should not, therefore, be construed in a limiting sense. The scope of protection sought is set forth in the claims which follow.

We claim:

1. An aluminoxane catalyst component for use in the polymerization of olefins which comprises aluminoxane and an effective amount of a hydroxysiloxane for increased activity for the polymerization.

2. A catalyst component as claimed in claim 1 wherein the hydroxysiloxane is of the formula

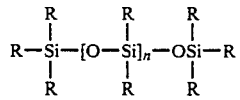

where at least one R is OH and the other R groups are independently selected from —OH, alkyl and aryl and n is from 0 to about 10.

3. A catalyst component as claimed in claim 1 wherein the hydroxysiloxane is a dihydroxysiloxane.

4. A catalyst component as claimed in claim 2 wherein the hydroxysiloxane is present at from about 1% to about 10% by weight of the aluminoxane.

5. A catalyst component as claimed in claim 4 wherein the hydroxysiloxane is a dihydroxysiloxane.

6. A catalyst component as claimed in claim 5 wherein the hydroxysiloxane is 1,3-dihydroxytetramethyldisiloxane.

7. A catalyst component as claimed in claim 5 wherein the hydroxysiloxane is 1,3-dihydroxy-1,3-dimethyl-1,3-diphenyldisiloxane.

8. A catalyst component as claimed in claim 5 wherein the hydroxysiloxane is 1,3-dihydroxy-1,3-tetraphenyldisiloxane.

9. A catalyst for the polymerization of olefins which comprises a compound of a Group IVB transition metal and an aluminoxane catalyst component which comprises an effective amount of a hydroxysiloxane for increased activity for the polymerization.

10. A catalyst as claimed in claim 9 wherein the hydroxysiloxane is of the formula

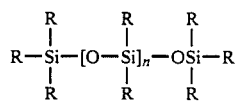

where at least one R is OH and the other R groups are independently selected from —OH, alkyl and aryl and n is from 0 to about 10.

11. A catalyst as claimed in claim 10 wherein the hydroxysiloxane is a dihydroxysiloxane and is present at from about 1% to about 10%, by weight of the aluminoxane.

12. A catalyst as claimed in claim 11 wherein the dihydroxysiloxane contains R groups selected from the group consisting of methyl and phenyl.

13. A catalyst as claimed in claim 11 wherein the Group IVB transition metal is zirconium.

14. A catalyst as claimed in claim 13 wherein the group IVB transition metal compound is bis(cyclopentadienyl) dichlorozirconium and the hydroxysiloxane is a dihydroxysiloxane which is present at from about 1% to about 10%, by weight of the aluminoxane.

* * * * *